United States Patent [19]

Ikemoto et al.

[11] Patent Number: 4,701,810
[45] Date of Patent: Oct. 20, 1987

[54] FACSIMILE APPARATUS

[75] Inventors: Yoshihiro Ikemoto, Katano; Jiro Kataoka, Kawanishi; Toshinori Otsuki, Yawata; Takuji Nakamura, Hirakata, all of Japan

[73] Assignee: Matsushita Electric Industrial Co. Ltd., Osaka, Japan

[21] Appl. No.: 889,859

[22] Filed: Jul. 28, 1986

[30] Foreign Application Priority Data

Jul. 30, 1985 [JP] Japan .................. 60-167903

[51] Int. Cl.$^4$ ............... H04N 1/21; H04N 1/23; G01D 9/00
[52] U.S. Cl. .................... 358/296; 358/285; 346/19
[58] Field of Search ............ 358/296, 298, 300, 285, 358/293; 346/19; 178/18, 19

[56] References Cited

U.S. PATENT DOCUMENTS

| 2,431,784 | 12/1947 | White | 346/19 X |
| 2,715,784 | 8/1955 | Genest | 346/19 |
| 4,319,283 | 3/1982 | Ozawa et al. | 358/296 X |
| 4,635,130 | 1/1987 | Oi | 358/296 |

Primary Examiner—Clifford C. Shaw
Assistant Examiner—Patrick W. Foster
Attorney, Agent, or Firm—Stevens, Davis Miller & Mosher

[57] ABSTRACT

A facsimile apparatus using a continuous length of recording paper with its first surface for recording and its second surface for transmitting scripts. Received facsimile signals are recorded on the first surface through a recording section, and scripts which are to be transmitted are written on the second surface and read through a reading section. This arrangement needs only one paper feeding passage and enables the paper to be efficiently used, since a non-recording surface of the paper can be used as a surface on which scripts are written.

8 Claims, 12 Drawing Figures

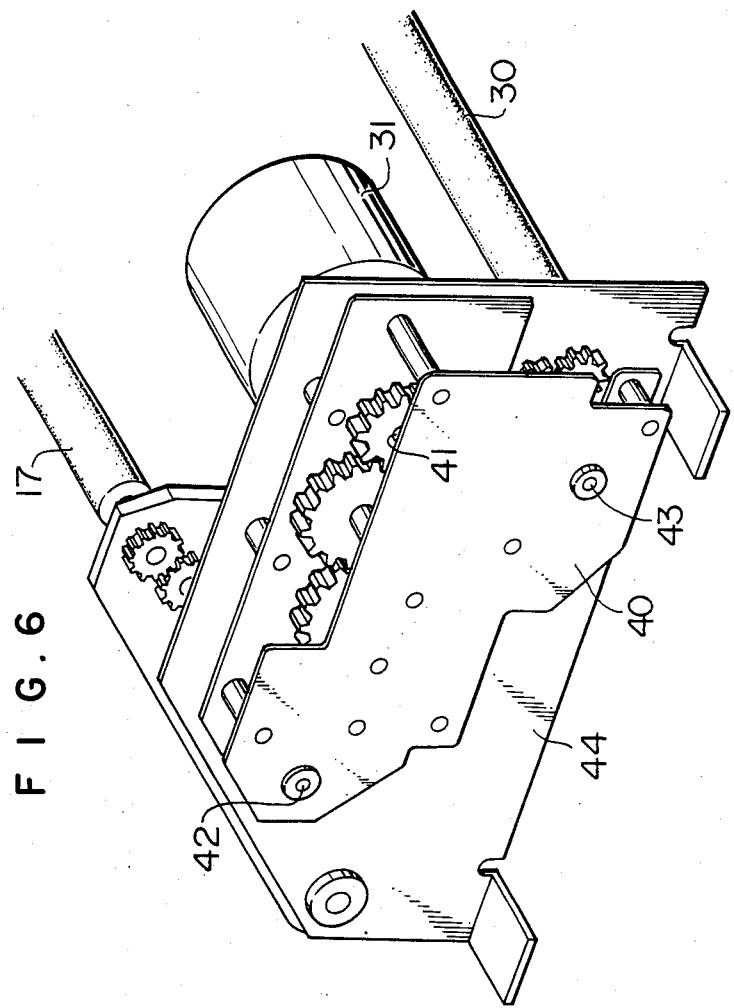

F I G. 7A
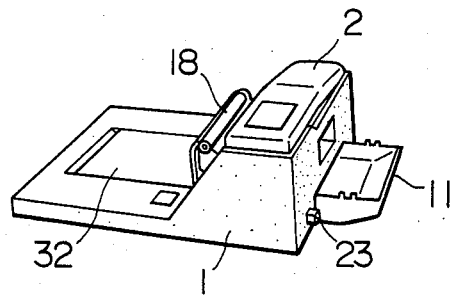
F I G. 7B
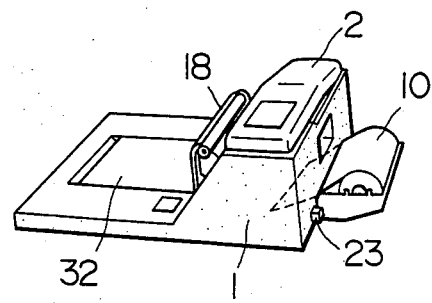
F I G. 7C
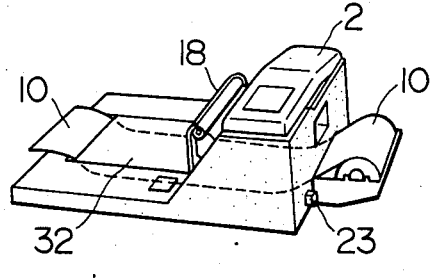
F I G. 7D
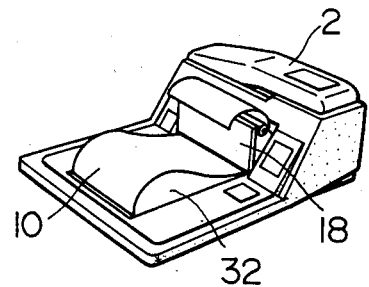

FACSIMILE APPARATUS

BACKGROUND OF THE INVENTION

1. Field of the Invention

The present invention relates to a facsimile apparatus in which a first surface of a continuous length of a recording paper is used for fax-reception recording and a second surface is used for fax-transmission scripts.

2. Description of Prior Art

Conventional methods for facsimile equipment have involved an arrangement in which a sheet of paper for reception only and a sheet of paper for transmission only are separately prepared and a reception recording paper passage and a transmission paper passage are separately formed. Accordingly, conventional facsimile equipment for use in office work have generally been large in dimension and have not been usable on desks as telephones.

One method for solving such a problem has been disclosed in Japanese Patent Unexamined Publication No. 107807/1975. According to this method, a flat portion is formed on a transference passage along which sheets of recording paper pass, and scripts are written by hand on the recording paper. The recording paper is used as a sheet of script transmission paper, thus reducing the size of the facsimile apparatus by combining transference passages.

Since, in this arrangement, the recording surface of the recording paper is also used as a script surface, portions on which a script to be transmitted are written cannot be used as recording paper, thus considerably increasing the amount of recording paper consumed compared with the above-described apparatus which used sheets of paper for recording only.

SUMMARY OF THE INVENTION

The primary object of the present invention is to provide a facsimile apparatus which is compact and suitable for use on a desk.

Another object of the present invention is to provide a facsimile apparatus in which a sheet of paper is used both as script transmission paper and as reception recording paper, thereby simplifying the paper feed passages of the apparatus.

A further object of the present invention is to provide an easier to use and cheaper facsimile device in which one and the same script transmission paper can be used several times so that it is possible to effectively use a recording paper and to reduce the cost of the facsimile device.

These objects of the present invention are achieved by using a first surface (recording surface) of a sheet of recording paper as a recording surface and using a second surface (non-recording surface) of the sheet of recording paper as a script transmission surface.

More concretely, a facsimile apparatus according to the present invention comprises:

a recording paper accommodating portion for accommodating a continuous length of recording paper;

a script table having a flat upper surface and disposed midway along a feed passage for the recording paper, the recording paper with its non-recording surface upturned being place on the script table;

a reading section disposed midway along the feed passage of the recording paper and adapted to allow scripts written on the non-recording surface of the recording paper to be read;

a recording section disposed midway along the feed passage of the recording paper and adapted for recording on the recording surface of the recording paper;

a conveying section having a motor, for conveying the recording paper along the feed passage;

a paper detecting section arranged along the feed passage, for detecting the presence of the recording paper, a control section for controlling the rotational speed of the motor of the conveying section in accordance with a signal from the paper detecting section, and, a transmitting and receiving section for transmitting a signal read through the reading section and for receiving a signal to be supplied to the recording section.

According to the arrangement embodying the present invention, only one paper feeding passage is formed since a sheet of paper is used both as transmission script paper and as reception recording paper. It is thus possible to simplify the construction and reduce the size of the apparatus to a great extent.

Since the non-recording surface of the recording paper is used for a script to be transmitted, the recording paper can be used for a second time as the script transmission paper after it is rewound, and the script transmission paper can be used for a second time as a recording paper after being rewound.

Further, even if the transmission of a script is missed, caused by, for example, failure of a telephone line, the script transmission paper can be rewound and is set at its original position so that it is possible to repeat the transmission with the same script, and further, if the one and the same script is transmitted to various locations, the script transmission paper can be rewound and is set at its original position several times to repeat the transmission, thereby it is possible to effectively use the recording paper and to reduce the use cost of the facsimile device.

Further, the presence of the recording paper on the feed passage can be detected in accordance with a signal from the paper detecting section, and therefore, the transfer direction of the recording paper can be automatically changed, according to the presence of the recording paper, providing an automatic feed and rewind of the recording paper.

BRIEF DESCRIPTION OF THE DRAWINGS

FIG. 6 is a perspective view of the essential part of a driving section of the apparatus according to the present invention;

FIG. 7A to FIG. 7D are perspective views illustrating the setting of a paper roll;

DESCRIPTION OF THE PREFERRED EMBODIMENT

Figure 1:
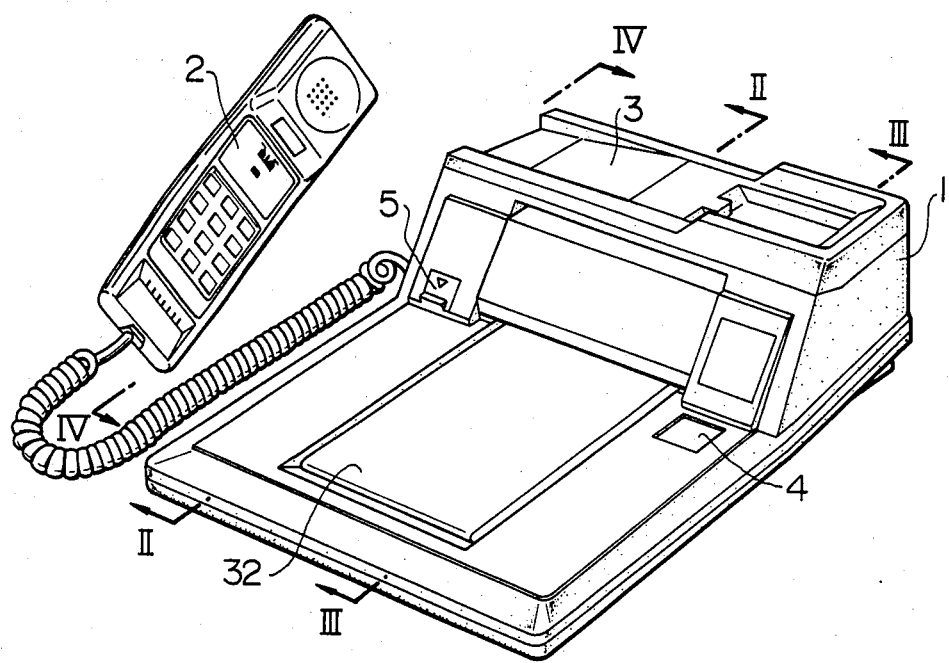
FIG. 1 is a perspective view of the overall construction of a facsimile apparatus which is an embodiment of the present invention.
Figure 2:
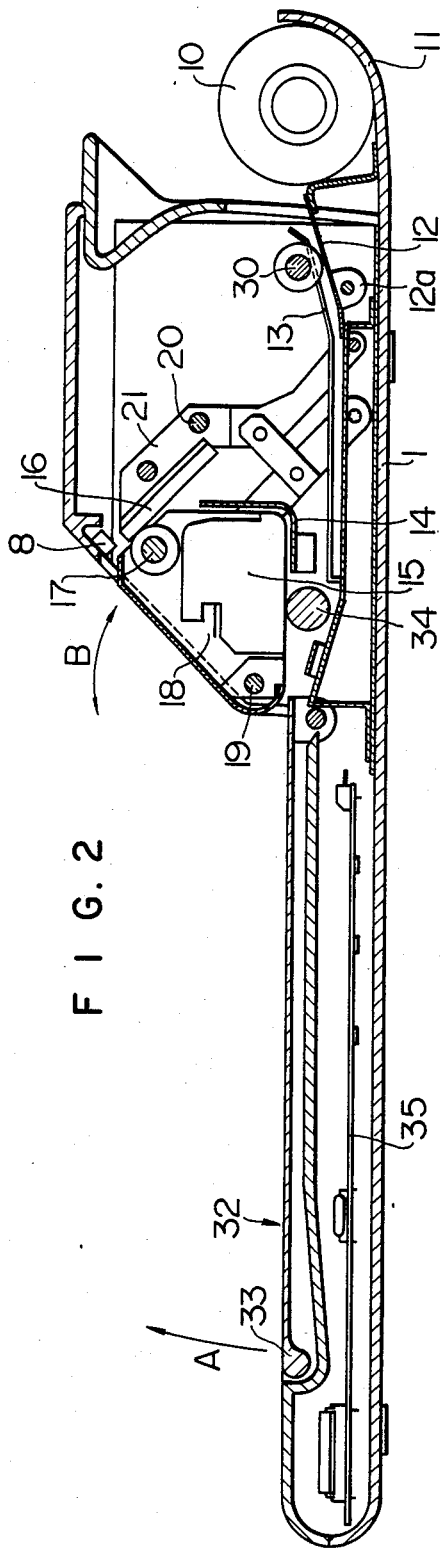
FIG. 2 is a cross-sectional view taken along the line II—II of FIG. 1.
Figure 3:
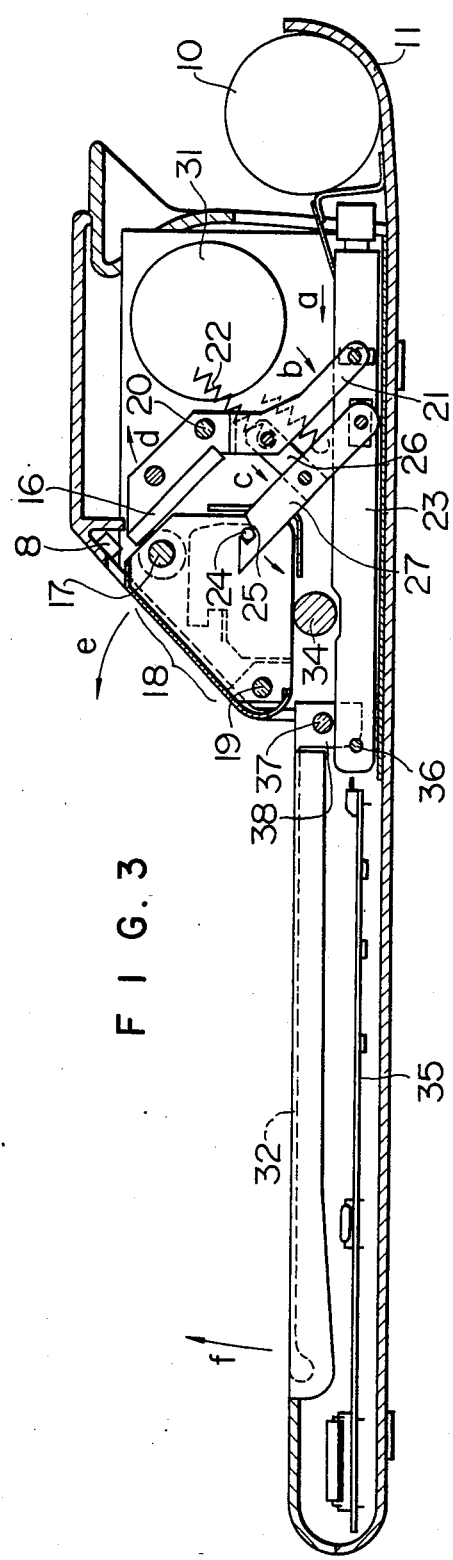
FIG. 3 is a cross-sectional view taken along the line III—III of FIG. 1.
Figure 4:
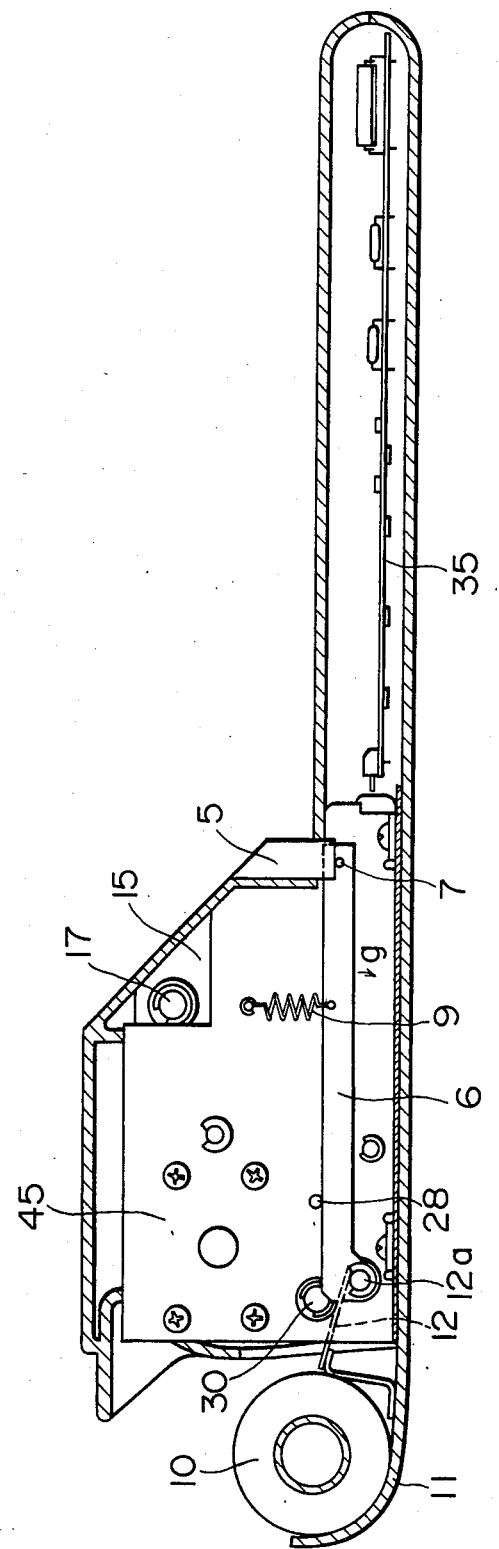
FIG. 4 is a cross-sectional view taken along the line IV—IV of FIG. 1.

FIG. 1 shows the overall constitution of a facsimile apparatus which is an embodiment of the present invention. FIG. 2 is a cross-sectional view taken along line II—II of FIG. 1, and FIG. 3 is a cross-sectional view taken along line III—III of FIG. 1. FIG. 4 is a cross-sectional view taken along line IV—IV of FIG. 1. The apparatus has a body 1 on which is formed a cradle 3 for accommodating a transmitting and receiving handset 2 constituting a telephone. Reference numerals 4 and 5 respectively indicate a fax-transmission switch and a paper feeding and rewinding switch.

Referring to FIGS. 2 and 3, reference numeral 8 denotes a paper detecting sensor attached to the terminal end of a paper feed passage and composed of a light-emitting diode and a light receiving element, for detecting the presence of a thermosensitive recording paper 10 on the paper feed passage, and reference numeral 31 denotes a stepping motor serving as a drive source for a paper conveying section. The rotational speed of the motor 31 is controlled in accordance with a signal delivered from the sensor 8.

As shown in FIG. 2, a rolled sheet of heat-sensitive recording paper 10 used as a script paper and a recording paper is placed on a recording paper receiving portion 11. Reference numerals 12, 13 and 14 indicate guide plates for guiding the recording paper 10, and a numeral 15 indicates an image sensor in which are incorporated a fluorescent lamp, an optical lens and reading element and which, together with a platen roller 17 facing a thermal recording head 16, integrally form an image sensor block 18. The image sensor block 18 is formed such as to be pivotally movable in the direction indicated by arrows B.

The thermal recording head 16 is attached to one end of an arm 21 which is pivotally moved around a supporting shaft 20 and which is itself attached by means of a hook to a spring 22 so as to be constantly urged in the direction reverse to that shown by an arrow c. The thermal recording head 16 is thereby pressed against the platen roller 17 at a constant pressure. An opening-closing lever 23 for the image sensor block 18 is slidably attached to the other end of the arm 21. A latch 27 having a connecting portion 25 for engaging with a latch pin 24 disposed on the image sensor block 18 and connected to the arm 21 through a joint lever 26 is pivotally movably attached to the opening-closing lever 23. A paper feeding roller 30 shown in FIG. 2 is rotated by a stepping motor 31 through a gear head 40 as shown in FIG. 6 such as to feed the heat-sensitive recording paper 10.

Figure 5:
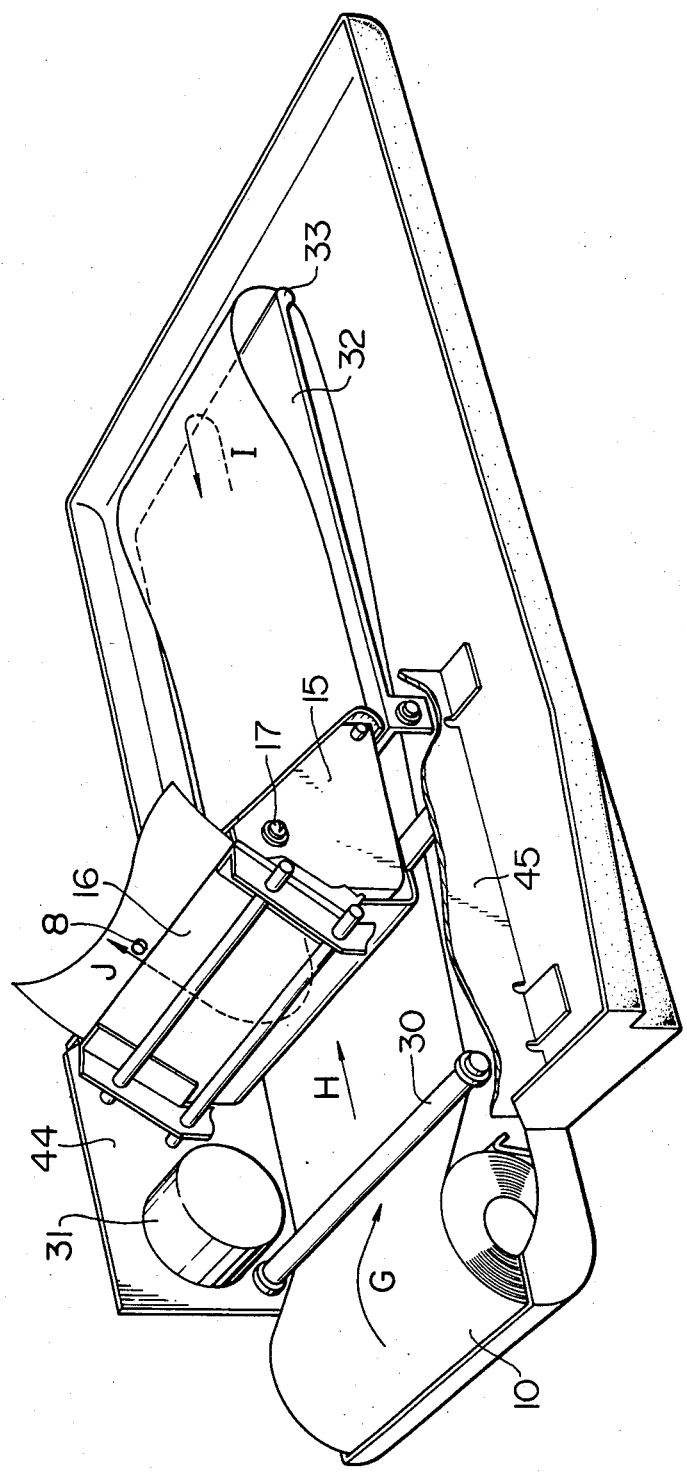
FIG. 5 is a partially cut-away perspective view showing a passage for feeding a sheet of paper unwound from a roll.

FIG. 5 shows in perspective a paper feed passage for the heat-sensitive recording paper 10, the apparatus being shown in a partially cut away form. The rolled sheet of heat-sensitive paper 10 placed in the recording paper receiving portion 11 is unwound and fed along the paper feed passage, as indicated by the arrows G, H, I, J.

The paper passes, in the first place, under a script table 32 between the guide plates 12 and 13 while being fed forwards as indicated by the arrow H. It is turned around at an edge 33 as indicated by the arrow I, and passes over the script table 32 before entering the interior of the apparatus again, and it then emerges to the outside as indicated by the arrow J after passing between the image sensor 15 and each of rotatable platen 34 and guide plate 14, then passing between the thermal recording head 16 and the platen roller 17 and passing under the paper detecting sensor 8. The apparatus incorporates in the body 1 under the script table 32 a circuit board 35 having electronic components such as integrated circuits and resistances constituting transmitting and receiving sections and a control section for controlling the rotational speed of the stepping motor 31.

FIG. 6 shows in perspective the main part of this embodiment including a driving section whose motion is entirely supplied by the stepping motor 31. The output shaft of the stepping motor 31 is connected to the input shaft 41 of the gear head 40 having a plurality of gears constituting a speed reduction mechanism. The rotation of the stepping motor 31 is decelerated by the gear head 40 and thereafter transmitted to the platen roller 17 and to the paper feeding roller 30 respectively connected to output shafts 42 and 43 of the gear head 40. The stepping motor 31 and the gear head 40 are supported on a side plate 44, and the platen roller 17 and the paper feeding roller 30 are supported by a pair of side plates 44 and 45 (refer to FIG. 5).

Next, the opening and closing mechanism of the image sensor block 18 and the script table 32 will be described with reference to FIG. 3. When the opening-closing lever 23 is moved in a direction indicated by an arrow a, the arm 21 is pivotally moved around the thermal recording head supporting shaft 20 in the direction indicated by an arrow b, and the thermal recording head 16 is detached from the platen roller 17, the joint lever 26 being simultaneously moved in linked relationship with the head. Then, the latch 27, which has until this stage been in engagement at its engaging portion 25 with the latch pin 24 on the image sensor block 18, is disengaged therefrom, and the image sensor block 18 is moved in the direction indicated by an arrow e by the force of a torsion coil spring (not shown). Simultaneously, the engagement between the edge 38 of the script table 32 and a script table latch pin 36 formed on the opening-closing lever 23 is released, and the script table 32 is opened by the force of a torsion coil spring (not shown) while pivoting around a script table supporting shaft 37 in the direction indicated by an arrow f.

The image sensor block and the script table 32 are closed when they are pushed by hand in the directions e' and f' respectively. Then, the engaging portion 25 of the latch 27 engages with the latch pin 24, and the script table 32 is prevented from pivotally moving by the engagement between its edge 38 and the latch pin 36, thus maintaining the closed state.

Next, the step of setting the heat-sensitive recording paper 10 will be described with reference to FIGS. 2 to 5 and FIGS. 7A through 7D.

Figure 8:
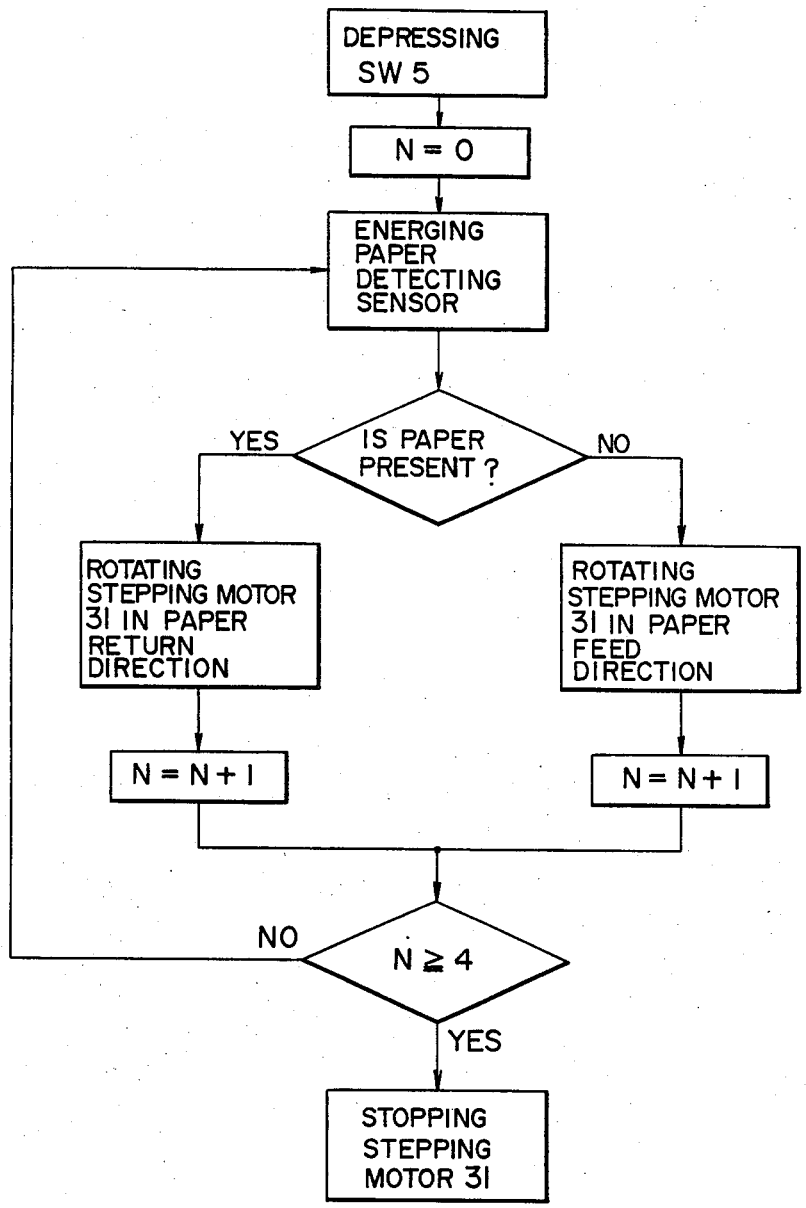
FIG. 8 is a flow-chart explaining the operation, as an example, of a control section for the feed and return of a recording paper in the facsimile apparatus as shown in FIG. 1.

The opening-closing lever 23 shown in FIG. 3 is first pushed down so that the image sensor block 18 is opened and set to be in the state shown in FIG. 7A, and the heat-sensitive recording paper roll 10 is placed on the recording paper receiving portion 11. Next, as shown in FIG. 7B, after the leading edge of the recording paper 10 is introduced between the guide plates 12 and 13, when the switch 5 is pushed as shown in FIG. 4, a paper feed lever 6 fixed to a shaft 12a is turned around the shaft 12a in the direction g, being guided by a paper feed lever pin 7 secured onto the lever 6. Accordingly, the guide plate 12 is rotated around the shaft 12a to pinch the recording paper 10 between itself and the paper feeding roller 30. At this time the paper detecting sensor 8 attached to the terminal end of the paper feed passage for the recording paper 10, is energized in association with the operation of the switch 5, and therefore, the sensor 8 detects no presence of the recording paper 10 on the passage. A signal indicating no paper is delivered from the sensor 8 to the control section (not shown) for controlling the rotational speed of the stepping motor 31 serving as the drive source of the conveying section. Therefore, the stepping motor 31 is rotated in the direction of feed of the recording paper 10 in accordance with the flow-chart as shown in FIG. 8. As a result, the paper feeding roller 30 is also rotated to automatically feed the recording paper 10 as indicated by the arrows G, H, I, J. When the leading end part of the recording paper 10 is exposed by a given length in front of the script table 32 (refer to FIG. 7C), the rotation of the paper feeding roller 30 is stopped by releasing the switch 5.

When the switch 5 is released from its depressed position, the switch 5 is raised upward since a spring 9 hooked onto the paper feed lever 6 urges the latter in the direction reverse to the direction of the arrow g. In FIG. 4, reference numeral 28 is a stopper pin for the paper feed lever 6.

Then, after the recording paper 10 has been pulled forward a little farther by hand, when the leading end section of the recording paper which is introduced again in the apparatus from below image sensor block 18 emerges to some extent from the upper surface of the image sensor block 18 which is at this stage open (refer to FIG. 7D), the image sensor block 18 is closed. Further, when a switch 5 is depressed, the guide 12 is rotated around the shaft 12a to be pressed against the paper feeding roller by means of the paper feed lever 6 in the steps mentioned above, and the paper detecting sensor 8 is energized to detect the recording paper on the paper feed passage. Therefore, the control section (not shown) receives a signal indicating the presence of the recording paper 10 from the paper detecting sensor 8, and therefore, controls the stepping motor 31 in accordance with the flow-chart as shown in FIG. 8, so that the motor 31 is rotated in such a direction that the paper feed roller 10 and the platen roller 17 are rotated together to automatically rewind the recording paper 10 in the direction as J→I→H→G. The recording paper 10 has been rewound after the leading edge of the recording paper 10 passes the lower part of the paper detecting sensor 8, the latter detecting no recording paper on the paper feed passage. Accordingly, the control section controls the stepping motor 31 to rotate the latter in the direction of feed of the recording paper 10. When the feed and return of the recording paper 10 are repeated by two cycles (in one cycle the paper detecting sensor 8 once detects the recording paper 10 on the paper feed passage and then once detects no recording paper thereon), the control section judges that the depression of the switch 5 is continuously held and therefore, stops the rotation of the stepping motor 31. Thus, the loading set of the recording paper 10 onto the apparatus is completed.

The operation of transmission and reception will now be described. For transmission of a script, the object of a transmission is first written on the reverse side of the recording paper located on the script table 32 by means of a writing instrument. When the script thereby written is to be transmitted, a facsimile apparatus at the receiving end is called by using the transmitting and receiving handset 2, and the transmission switch 4 is thereafter pushed so that the recording paper is fed under the reading section. The script is read while the recording paper passes under the image sensor 15, thus transmitting the script. It is noted that when the transmission switch is depressed, signals from the switch 5 and the paper detecting sensor 8 are negated, and therefore the stepping motor 31 is controlled by a signal from the transmitting and receiving section.

On the other hand, at the time of reception, the thermal recording head 16 causes the surface of the heat-sensitive recording paper 10 to be colored in a heat-sensing manner in accordance with received facsimile signals.

When the recording paper 10 is rewound in order to use the back surface of the recording paper 10 which has been already recorded, as a script transmission paper, or in order to use the front surface of the recording paper 10 which has been already used as a script transmission paper, as a recording paper, the switch 5 is depressed to rotate the guide plate 12 about the shaft 12a by means of the paper feed lever 6 in the steps mentioned above, so that the guide plate 12 is pressed against the paper feeding roller 30, and the sensor 8 is energized to detect the recording paper 10 on the passage so that a signal indicating a paper on the passage is delivered to the control section which is not shown. Accordingly the control section rotates the stepping motor 31 in the direction of rewind of the recording paper 10 in accordance with the flow-chart shown in FIG. 8. Accordingly, the platen rolle. 17 and the paper feed roller 30 are rotated in the direction of rewind of the recording paper 10 to automatically rewind the recording paper 10. In this phase, as mentioned above, when the feed and return of the leading edge of the recording paper 10 are repeated by two cycles along the lower section of the paper detecting sensor 8, the stepping motor 31 is automatically stopped.

Next, the usage of the apparatus embodying the present invention will be described.

Figure 9:
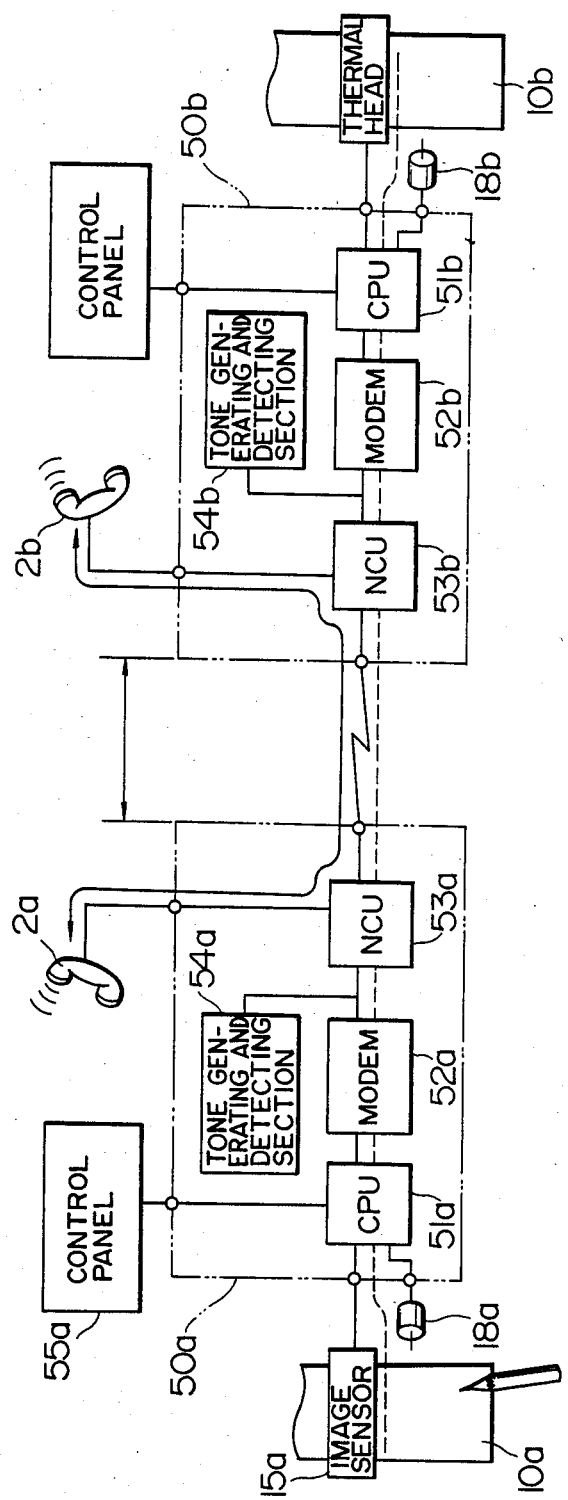
FIG. 9 is a diagram schematically showing the flows of a voice signal and a picture signal.

FIG. 9 schematically shows the flow of voice signals and image signals in this apparatus. As shown in this figure, the transmitted and receiving sections 50a and 50b are composed of microprocessers (CPU) 51a and 51b, modems 52a and 52b, NCUs 53a and 54a, and tone generating and detecting sections 54a and 54b. These CPUs 51a, 51b serve as CPUs in the above-mentioned control section.

In a waiting state, the transmitting and receiving handset modules 2a and 2b are connected to a telephone circuit. When, in this state, a mode switch disposed on a control panel 55 is pushed to the at-home side, the telephone function is selected with priority to facsimile function so that the apparatus is used as an ordinary telephone. If, at this time, the transmission switch 4 is pushed, the CPU 51a switches the telephone circuit from the side of the transmitting and receiving handset module 2a to the side of the modem 52 after confirming the communicated state. The facsimile transmission is thus started.

Image signal transmission starts and finishes in accordance with tone signal exchanges, and the facsimile transmission starts when a call tone signal is supplied from the tone generating section 54a located on the transmission side. On the reception side, this starting tone is constantly awaited and the operation of reception is carried out when the starting tone is detected. The synchronization between transmission and reception is thereafter carried out in accordance with phase signals. When the synchronization is completed, a tone signal which represents the completed state of preparation for reception is transmitted from the reception side, the transmission of image information written on the script is started.

The image information written on the script paper is converted into electrical signals by an image sensor 15a and is accumulated in an interior memory incorporated in the CPU 51. Each unit of the read process carried out by the image sensor 15a corresponds to one line. Every time a line of information is read, a stepping motor 18a feeds a length of paper corresponding to one line. Items of accumulated image information are successively inputted into the modem 52a, and they are thereby converted into voice range signals and output to the telephone circuit.

On the reception side, received modulated signals are demodulated by the modem 52b, and the original image signals are accumulated in the interior memory of the CPU 51a. Each unit of the accumulated image signals corresponding to one line is successively transferred to the thermal recording head 16b, which causes a sheet of heat-sensitive recording paper 10b to be colored in accordance with the image signals. Every time an item of information for one line is recorded, a stepping motor 18b feeds a length of paper corresponding to one line, in a manner similar to that of the read operation.

When transmission process of image signals for one page is completed, a tone signal indicating an end of message is transmitted from the transmission side, and, in response to this, a message recognition tone signal is outputted from the reception side. After this sequence has finished, the telephone circuit is returned to the side of the transmitting and receiving handset module 2b, and telephone communications become possible.

Further, if a transmission of a script is missed due to an inferior condition of a telephone line, retransmission is required. Even in this case, the switch 5 is depressed to rotate the guide plate 12 about the shaft 12a by means of the paper feed lever 6 in the steps as mentioned above, so that it is pressed against the paper feeding roller 30, and the paper detecting sensor 8 is energized to detect the recording paper on the passage so that a signal indicating the recording paper 10 on the path is delivered to the control section which is not shown. Accordingly, in accordance with the flow-chart shown in FIG. 8, the stepping motor 31 is rotated in the direction of rewind of the recording paper 10, and therefore, the platen roller 17 and the paper feed roller 30 are rotated in the direction of rewind of the recording paper 10 to automatically wind up the recording paper 10, thereby the transmission script is returned to its original position. Therefore, when the facsimile transmission switch 4 is depressed again, retransmission can be effected.

It is noted that when one and the same script is transmitted to several locations, the script paper is rewound in the same steps to be set at its original position, and the communication is successively established several times to the several locations.

As far as explained above, the feed and return of the leading edge of the recording paper 10 are repeated by two cycles, however this is only of the purpose of high reliability, it can be said that only one cycle is sufficient to attain a desired function.

What is claimed is:

1. A facsimile apparatus comprising:
   a recording paper accommodating portion for accommodating a continuous length of recording paper;
   a script table having a flat upper surface and disposed midway along a feed passage for said recording paper, said recording paper with its non-recording surface upturned being place on said script table;
   a reading section disposed midway along said feed passage of said recording paper and adapted to allow scripts written on said non-recording surface of said recording paper to be read;
   a recording section disposed midway along said feed passage of said recording paper and adapted for recording on said recording surface of said recording paper;
   a conveying section including a motor for conveying said recording paper along said feed passage;
   a detecting section provided along said feed passage of the recording paper, for detecting the presence of the recording paper,
   a control section controlling said motor in accordance with a signal from said paper detecting section, and
   a transmitting and receiving section for transmitting a signal read through said reading section and for receiving a signal to be supplied to said recording section.

2. A facsimile apparatus according to claim 1, wherein said continuous length of recording paper is provided in the form of a rolled sheet.

3. A facsimile apparatus according to claim 1, wherein a sheet of heat-sensitive paper is used as said recording paper, and said recording section includes a heat recording head.

4. A facsimile apparatus comprising:
   a recording paper accommodating portion for accommodating a continuous length of recording paper;
   a script table having a flat upper surface and disposed midway along a feed passage for said recording paper, said recording paper with its non-recording surface upturned being place on said script table;
   a reading section disposed midway along said feed passage of said recording paper and adapted to allow scripts written on said non-recording surface of said recording paper to be read;
   a recording section disposed midway along said feed passage of said recording paper and adapted for recording on said recording surface of said recording paper;
   a conveying section for conveying said recording paper along said feed passage, said conveying section having a motor, a rotation transmitting mechanism for transmitting the rotation of said motor to two rollers disposed in the vicinity of the starting and finishing ends of said feeding passage;
   a detecting section provided along said feed passage of the recording paper, for detecting the presence of the recording paper;
   a control section controlling said motor in accordance with a signal from said paper detecting section; and
   a transmitting and receiving section for transmitting a signal read through said reading section and for receiving a signal to be supplied to said recording section.

5. A facsimile apparatus according to claim 4, wherein said continuous length of recording paper is provided in the form of a rolled sheet.

6. A facsimile apparatus according to claim 4, wherein a sheet of heat-sensitive paper is used as said recording paper, and said recording section includes a heat recording head.

7. A facsimile apparatus according to claim 4, wherein a paper guide is rotatably provided about a shaft, in a position opposing a roller positioned in the vicinity of the starting end of said paper feed passage, and a press means is further provided for rotating said guide so as to press said guide against said roller.

8. A facsimile apparatus according to claim 7, wherein a change-over means is provided for changing over the rotational direction of said motor in association with the rotation of said paper guide.

* * * * *